Patented June 3, 1924.

1,496,606

UNITED STATES PATENT OFFICE.

HAROLD F. SAUNDERS, OF CLEVELAND, OHIO, ASSIGNOR TO THE CHEMICAL SPECIALTIES COMPANY, OF CLEVELAND, OHIO, A CORPORATION OF OHIO.

PROCESS FOR PRODUCING FERRIC PIGMENTS.

No Drawing.    Application filed March 4, 1922.   Serial No. 541,197.

*To all whom it may concern:*

Be it known that I, HAROLD F. SAUNDERS, a citizen of the United States, residing in the city of Cleveland, county of Cuyahoga, and State of Ohio, have invented certain new and useful Improvements in Processes for Producing Ferric Pigments, of which the following is a specification.

My invention relates to processes for the production of ferric pigments, and more particularly relates to the production of ferric pigments by means of processes involving electrolysis.

One of the objects of my invention is to provide a process for producing ferric pigments, and another object of my invention is to provide a process for producing ferric pigments having any one of a number of different shades within a wide range, and further to provide a process whereby the exact shade of the pigment produced may be predetermined. My objects also include the provision of a process whereby oxides of iron obtained by electrolytic methods may be converted into a ferric pigment of good covering and staining power. Other objects of my invention will be in part obvious and in part pointed out hereinafter.

According to the process described in the specification of my application for United States Letters Patent Serial No. 535384, filed February 9, 1922, for improvements in processes for producing ferric pigments, ferric pigments are produced by the calcination of hydroxides of iron obtained in the electrolysis of salts with an iron anode and a cathode of any conducting material.

In my present process I produce ferric pigments by treating with heat oxides of iron obtained by electrolytic methods.

The shade, strength and brilliancy of many pigments, including the iron pigments, depend not upon their chemical constitution, but upon their physical condition and intermolecular arrangement. Thus by a variation in treatment a tremendous range of shades may be produced, varying from yellow to a deep maroon, yet upon chemical analysis these various pigments have identically the same composition.

In my process the first control of the final physical constitution of the pigment is secured in the electrolytic process, where, by varying the concentration of the electrolyte, the character of the salt composing the electrolyte, the temperature, etc., any desired degree of dispersion from an actual colloid to a coarse, granular construction may be obtained. As deposited, this oxide has little value, being of a brownish or greenish black color and of dull lustre. This precipitated oxide is then removed from the electrolytic bath by suitable means such as filtration, washed and dried, and passed to a muffle furnace where it is treated by heat of varying intensity and time, whereby its physical constitution is changed to such an extent that it acquires any desired shade from yellowish red to blue-red, according to the time of treatment and the temperature used. Many special shades may be secured by heating first at a high temperature for a short period of time, and then lowering the temperature and maintaining at this lower temperature for a longer period of time.

As an example of my process, an electrolytic bath composed of sodium nitrate in solution is electrolyzed with a ferrous anode and a cathode of any conducting material while maintained at a temperature of 80 to 90 degrees centigrade. By the use of this high temperature a great efficiency of electromotive force is secured and the oxides are precipitated in a finely divided form. These oxides are withdrawn from the electrolyte by passing the latter through a filter press, dried and passed into a muffle furnace maintained at 1800° F. for one hour. The temperature is then allowed to drop to 1000° F. and held there for a period of three hours. The material is then withdrawn and cooled, ground in a mill and is found to possess beautiful red-brown color of excellent brilliancy and covering power.

Under certain conditions, as by use of moderate temperature, certain salts in the electrolytic bath, etc. a mixture of oxide of iron and hydroxide of iron may be obtained. Obviously, this mixture may be suitably treated with heat to produce a pigment.

As many changes could be made in carrying out the above process without departing from the scope of the invention, it is intended that all matter contained in the above description shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

What I claim is:—

1. A process of the character described, which consists of precipitating oxide of iron in an electrolyte by electrolysis, removing the precipitated oxide of iron from the electrolyte and converting said removed oxide into a red ferric pigment by treating said oxide with heat.

2. A process for producing ferric pigment which includes the step of electrolyzing a solution of an ionizable salt in the presence of an iron anode under the influence of heat whereby oxide of iron is obtained directly in the electrolyte.

3. The process as in claim 2 wherein the electrolyte is maintained at a temperature above 70 degrees centigrade during the electrolysis.

4. A process for producing oxide of iron directly by electrolysis, which consists of applying heat during the electrolysis of a solution of an ionizable salt in the presence of an iron anode.

5. The process as in claim 4 wherein the applied heat is above 70 degrees centigrade.

6. A process for producing ferric pigment, which consists in providing an electrolyte consisting of a solution of an ionizable salt, providing a ferrous anode and a conducting cathode therein, and establishing electrolysis while maintaining said bath at a temperature above 70° C. to precipitate oxides of iron directly in said electrolyte, removing said oxides from said bath, drying said oxides and treating said oxides with sustained heat at high temperature to convert said oxides into red ferric pigment.

7. A process for producing ferric pigments of red-brown color, which consists of providing an electrolytic bath composed of sodium nitrate in solution, providing a ferrous anode and a conducting cathode therein and establishing electrolysis while maintaining said bath at a temperature of between 80 and 90 degrees centigrade, segregating oxides of iron precipitate in said bath, drying said oxides of iron and maintaining the same at a temperature of 1800 degrees Fahrenheit for one hour and thereafter maintaining said oxides of iron at a temperature of 1000 degrees Fahrenheit for a period of three hours.

8. As an article of manufacture, a red ferric pigment consisting of calcined oxide of iron obtained directly by electrolysis at high temperature.

This specification signed and witnessed this 28 day of February, 1922.

HAROLD F. SAUNDERS.

Witnesses:
 HENRY E. WOOLEVER,
 HELEN FRIEDEL.